Figure 1:
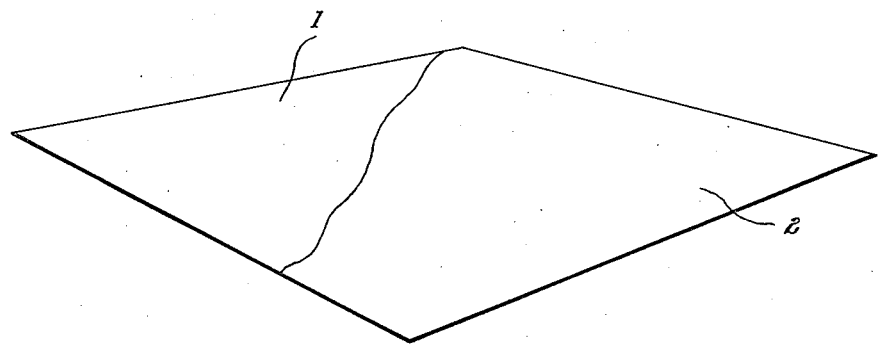
Figure 2:
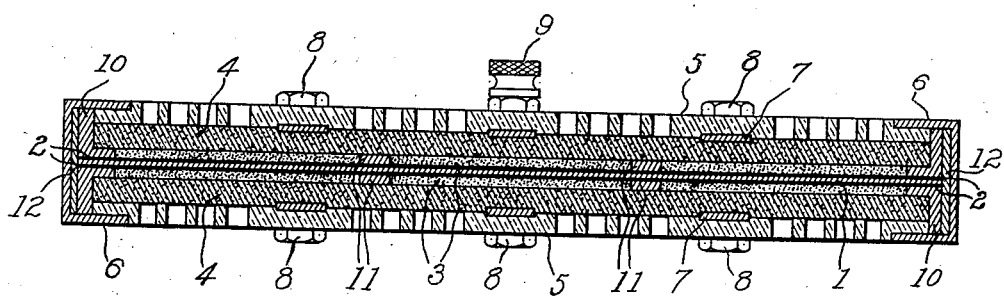

May 3, 1932.  G. W. HEISE  1,856,386
PRIMARY BATTERY
Filed Dec. 28, 1926

George W. Heise
INVENTOR.

BY *Byrnes, Townsend & Potterwether*
ATTORNEYS.

Patented May 3, 1932

1,856,386

UNITED STATES PATENT OFFICE

GEORGE W. HEISE, OF LAKEWOOD, OHIO, ASSIGNOR TO NATIONAL CARBON COMPANY, INC., A CORPORATION OF NEW YORK

PRIMARY BATTERY

Application filed December 23, 1926. Serial No. 157,594.

This invention relates to primary batteries and particularly to those adapted for use in miners' lamps and in other situations where the cell is subjected to heavy current drain for an extended period of time.

In designing battery lamps the two most important determining factors as to the type of lamp to be used are the initial peak of the battery voltage curve and its duration. The flatter the over-all voltage curve the more efficient the lamp can be made both as respects efficiency in service and as respects its service life. The present invention has for its principal object the production of a dry cell adapted on heavy current drain service to give up its available current with less variation between the voltage at the beginning of its service life and the voltage at the end of its service life without detrimentally affecting the total service capacity of the cell.

According to the present invention the initial voltage of the cell is reduced by applying to the anode metal a coating of a metal which is more cathodic than the anode metal. This coating should be continuous so that the voltage of the coating metal and not that of the coated metal is initially effective, and also it should be thin enough to dissolve electrolytically in a comparatively short time without affecting the total service capacity of the cell. A coating of such thickness as to be removable in a period of time equal to 10% or less of the life of the cell is satisfactory. The metal coating may be applied by electrodeposition, by a spraying process such for example as the Schoop process, or by any other suitable means. It is also satisfactory to apply the coating metal in the form of foil.

Examples of coating metals which have given satisfactory results when used on a zinc anode are copper and cadmium. These metals have been electrodeposited on zinc used in forming anodes of air-depolarized cells of the type disclosed in my copending application Serial No. 49,404, filed August 10, 1925, and these cells have given the following voltages on heavy drain continuous test as compared with cells embodying uncoated zinc anodes:

|  | Initial closed circuit voltage | Cut-off voltage | Range of operating voltage— | |
|---|---|---|---|---|
|  |  |  | Per cell | Per 2 cell battery |
| Control zinc anode | 1.22 | 0.75 | 0.47 | 0.94 |
| Copper plated zinc anode | 1.00 | 0.75 | 0.25 | 0.50 |
| Cadmium plated anode | 1.00 | 0.75 | 0.25 | 0.50 |

It will be seen from the above table that the operating voltage range has been reduced nearly 50%, thereby making it possible to use a battery of these cells in combination with a lamp the filament of which would be readily burned out if operated under the high initial voltages obtaining with the cells of the prior art, but which because of the substantially lower voltage range during operation with cells embodying the present invention gives a steady light of more uniform brilliance throughout the life of the battery.

Since many of the more cathodic metals, and especially copper, accelerate zinc corrosion in the presence of electrolyte in dry cells, this invention is particularly applicable to cells in which the zinc anode is kept out of contact with the electrolyte until the cell is to be put into operation, and to a cell which when put in service is subjected to heavy current drain either continuously until exhausted or over intermittent periods of operation which lead to the exhaustion of the cells after a few days operation. Consequently the invention is of particular applicability in cells of the type disclosed in my copending application Serial No. 49,404 above mentioned. However, the invention is not limited to such cells but is also applicable to deferred action cells of other types or in general to cells designed for service in which exhaustion will be effected in a comparatively short period of time.

In the drawings, Fig. I shows a perspective view of an anode embodying the present invention:

Fig. II is a transverse section of a flat dry cell of the air-depolarized type disclosed in my copending application Serial No. 49,404, which includes a coated metal anode similar to the one shown in Fig. I but with the coating metal applied to both sides of the base metal.

The dry cell comprises a centrally disposed zinc anode 1 having a copper coating 2 on both of its faces. When the anode is assembled with the other cell elements as shown in the drawings there is positioned on each side of the anode first a layer of paste electrolyte 3, then a cathode 4, and finally a side plate 5. These several elements are assembled in a suitable frame or holder which is of a construction permitting ready replacement of the anode and paste, and preferably of the cathode layer as well. As illustrated the holder comprises two side frames 6 which are secured together by hinges or other means not shown in such a manner as to hold the cell elements in assembled condition under pressure. The side plates 5, which are carried by the side frames 6, are of perforated hard rubber, wood or the like, provided with internal contact strips 7 which may be of carbon or of a suitable noncorrodible metal or alloy. These contact strips are secured to the frame and electrically connected therewith by screws 8 one of which serves as the cathode terminal 9. Insulating guide strips 10 which prevent the anode from contacting with the cathodes 4 are provided at the opposite sides of the cell assembly, and supplementary insulating guide strips 11. 11 are preferably arranged to extend across the frame at one or more intermediate points, the assembly being such that the coated zinc anode may be readily inserted or removed. Strips 12 of pulpboard, cloth or the like serve to prevent leakage at the junction line of the frame parts.

In order to reduce local action and corrosion of the zinc electrode in dry cells intended for use on light current drains over extended periods of time, it has been proposed by Benner and French in United States Patent No. 1,425,573, to coat the zinc electrode with a metal tending to decrease such local action and corrosion. It is to be noted, however, that while the patentees state that the zinc electrode may be entirely covered with the coating metal, they are interested primarily in obtaining an amalgamation of the coating metal,—lead—,with the zinc and that in the preferred form of their invention they utilize mercury as a third metal to bring about such amalgamation. In other words, they seek to obtain an electrode which, during the whole of its service life, exhibits greater resistance to corrosion and local action than is shown by zinc alone whereas according to the present invention it is intended that the coating metal shall be consumed after a relatively small portion of the service life of the cell has elapsed but that until such metal is consumed its potential and not that of the underlying metal will be determinative as to the voltage of the cell.

I claim:

1. In a dry cell for heavy duty service, a cathode, and a zinc anode having a layer of copper completely covering its operative face.

2. In a dry cell a cathode, a zinc anode, and a layer of metal more cathodic than zinc completely covering the active surface of the anode; said metal layer being of such thickness that it will dissolve electrolytically in a period of time equal to not more than 10% of the life of the cell.

3. In a dry cell a cathode, a zinc anode, and a layer of copper completely covering the active surface of the anode, said copper layer being of such thickness that it will dissolve electrolytically in a period of time equal to not more than 10% of the life of the cell.

In testimony whereof, I affix my signature.

GEORGE W. HEISE.